(No Model.)
J. GIBBINS.
CLUTCH.
No. 289,249. Patented Nov. 27, 1883.
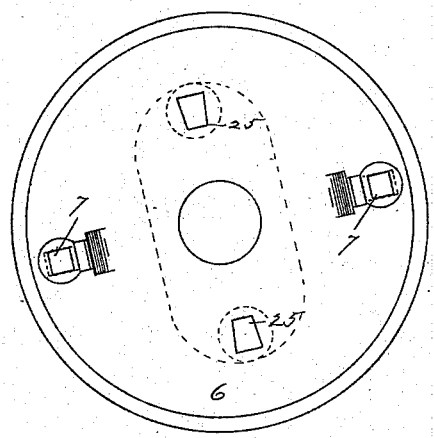
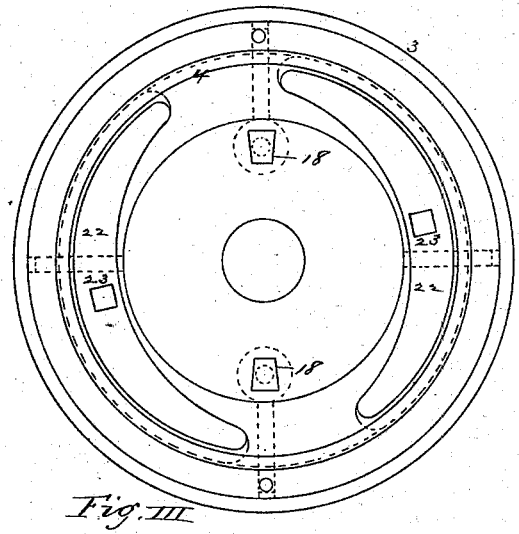
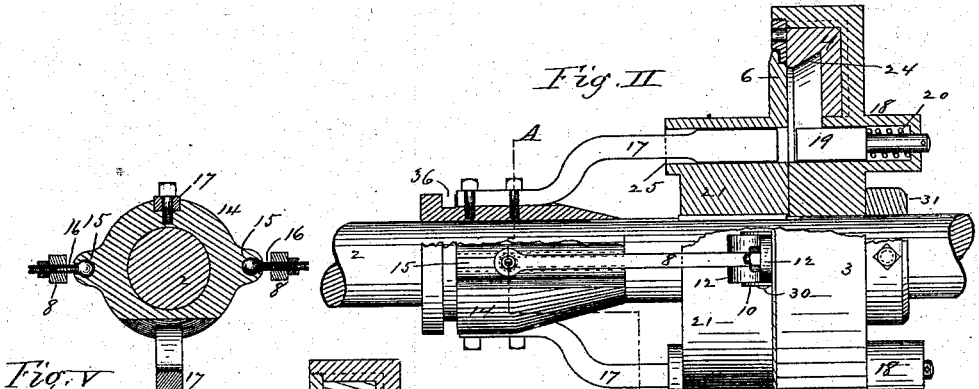
Witnesses.
Inventor.

UNITED STATES PATENT OFFICE.

JAMES GIBBINS, OF SPRINGFIELD, MASSACHUSETTS.

CLUTCH.

SPECIFICATION forming part of Letters Patent No. 289,249, dated November 27, 1883.

Application filed July 30, 1883. (No model.)

*To all whom it may concern:*

Be it known that I, JAMES GIBBINS, of Springfield, in the county of Hampden and State of Massachusetts, have invented a new and useful Improvement in Clutches, of which the following is a specification and description.

The object of my invention is to provide a clutch for coupling and driving shafting or machinery which may be operated by friction mechanism, or by a positive engaging mechanism with the friction mechanism combined therewith; and I accomplish this by the mechanism substantially as hereinafter described, and illustrated in the accompanying drawings, in which—

Figure I is a side view of a clutch made according to my invention, showing a side view of the operating-lever which actuates the friction-shoes. Fig. II is a side view of the same, with a portion thereof in section, showing the engaging-bars which form the positive portion of the clutch. Fig. III is a front view of the friction-bed of the loose pulley with the friction-shoes in place. Fig. IV is a front view of the actuating hub-plate in front of which the pulley revolves. Fig. V is a transverse section of the cone, shaft, and operating levers and bars at line A of Fig. II; and Fig. VI is a sectional view of the pulley and hub-plate at line B, where the lug extending through said plate engages with the friction-shoes, showing the positive mechanism which operates the friction-shoes in both directions—outward and inward; and Fig. VII is a front and sectional view of the link.

In the drawings, 2 represents a shaft, to which is keyed a plate, 6, having a hub, 21, so that said plate and its hub may revolve with the shaft, through which hub and plate extend the holes or sockets 25, as shown in Fig. II, and with slots made through the said plate, through which extend the lugs 7, whose inner ends I make of rectangular form to approximately fit the holes 23 in the shoes 22, and with the middle portion of the lug also made rectangular to approximately fit and move within the slots made through the plate, and with the outer end of each lug adapted to receive a link, 12, and a threaded nut turned upon the extreme end, as shown clearly in Fig. VI.

The friction-bed 4 of the pulley I make, preferably, of wood, with its periphery beveled, as at 24, and the periphery of each shoe 22 I also make beveled, to fit the beveled part 24 of the friction-bed of the pulley. I pivot the levers 8 to the hub, or its plate at 9, and I pivot a wedge, 10, to each lever 8 at 30, this wedge being located in the same slot in the plate through which the lug 7 extends, and just inside the lug, said wedge having a bearing and sliding against the end of the slot in the said plate, through which it and the lug move. The link 12 has a longitudinal slot, 13, made through it, through which extends the lever 8, and the outer end of said lever is provided with a bolt, 16, whose head—preferably made spherical—slides in cylindrical grooves, as 15, made in the cone 14, a portion of the latter being made inclined and a portion cylindrical, as shown clearly in Figs. I and II.

I make one or more sockets, 18, (two being preferable,) in the pulley 3, these sockets being preferably of rectangular form in cross-section, each socket having a jaw, 19, approximately fitted to slide therein, with a spring, as 20, in the socket behind the bolt, to keep the outer end of the latter always in a position projecting out beyond the face of the friction-bed 4, as shown clearly in Fig. II; and I make the holes 25 through the hub 21 at points equidistant from the axis of the pulley, as the sockets 18 are made, said holes being adapted to receive the ends of the bars 17, to slide freely therein, the outer ends of the bars being firmly secured to the cone 14, as shown clearly in Figs. I, II, and V. I secure a collar, 31, to the shaft 2, against the pulley 3, to hold the latter up in position against the plate 6. If the clutch is to be used to drive a machine or a counter-shaft, the hub 21 and plate 6 may be keyed to the shaft 2, and also the cone 14, if desired, and the pulley placed loosely on the same shaft, as shown in Fig. II, and a belt may extend around the pulley 3 and be connected with the pulley of the machine it is desired to drive. With a shipping-lever connected with the annular groove 36 in the cone and the latter in a position with the ends of the bars 17 just inserted in the sockets 25 and the heads of the bolts 16 just within the cylindrical grooves in the small end of the cone, the latter and plate 6 will revolve with the shaft, and the pulley 3 will remain stationary; but if the cone be moved along the shaft until the heads of the bolts 16 ride up the inclined part of the cone to the cylindrical part the levers 8 will be moved apart, the wedge 10 forced in, and the lugs 7 and shoes 22, with which the said lugs engage, will be forced out, forcing the beveled edges of the shoes into contact with the beveled part of the friction-bed 4, this movement also causing the flat back side of each shoe to bear against the flat face of the friction-bed, and the pulley 3 will be caused to revolve with the hub 21 and plate 6 and drive the machine. If the pulley 3 is to drive a counter-shaft or another shaft operating several machines, it may happen that sometimes there is more power to overcome or more machinery to be driven than at other times, and in cases where there is a large amount of work to be done or more power to be overcome than can be done well with the friction mechanism above described the cone 14 may be moved still farther along the shaft toward the pulley, and as the cylindrical part of the cone moves in, the heads of the bolts 16 will ride in their grooves and cause the levers 8 and the friction-shoes to remain in the same position; but the bars 17 will be moved in and be made to project through the plate 6, and their inner ends will engage with the projecting ends of the jaws 19, and thus exert a positive force to revolve the pulley 3, in addition to the frictional power of the shoes 22. Should the bars 17, in moving in, abut directly against the ends of the jaws 19, the latter will be moved in thereby and the springs behind them compressed until the plate and bars have revolved sufficiently to pass by the jaws, when the latter will be forced out into place by their springs, so that the bars 17, as they revolve, will engage against the side of each jaw and revolve the pulley.

It will be seen that in cases where comparatively little work is to be done the pulley may be driven by the frictional mechanism as a driving-power, and the power be applied very quickly, and when a great amount of power is to be overcome in driving machinery the positive mechanism may be added without any change of driving mechanism.

When the device is to be used to couple onto a shaft, to drive one shaft from another in the same line of shafting, the cone and the hub and its plate 6 are keyed to one shaft, and the pulley 3 is rigidly secured to the end of another shaft located adjacent thereto and in the same line, and the operation of the mechanism is precisely the same.

It will be seen that the grooves 15 in the cone 14 are adapted to hold the head of the bolt 16, so that when the cone is moved away from the actuating-plate 6 and the bolts 16 ride down the inclined portion of the cone the levers 8 are thereby moved toward each other, and the lugs 7 and the friction-shoes with which they are connected are drawn toward the axis of the shaft by the link 12, connecting the lugs 7 with the operating-levers 8, so that the friction-shoes are moved both inward and outward by the operating-levers.

Having thus described my invention, what I claim as new is—

1. The combination, in a clutch, of a pulley provided with a beveled friction-bed and beveled friction-shoes movable against said friction-bed, an actuating-plate, 6, the pivoted levers 8, the wedges 10, the lugs 7, movable through the plate and engaging with the friction-shoes, a link connecting each lug with its lever 8, and a sliding cone to operate said levers, substantially as described.

2. The combination, in a clutch, of a pulley containing a friction-bed, beveled friction-shoes movable thereon, an actuating-plate to engage with said pulley, actuating-levers 8, wedges 10, lugs 7, a link connecting each lug with its actuating-lever 8, and a sliding cone provided with grooves, each to receive and hold the head of a bolt secured to each said actuating-lever 8, whereby the lugs and friction-shoes are actuated in both directions— inward and outward—by the movement to and fro of said sliding cone, substantially as described.

3. The combination, in a clutch, of a pulley containing a friction-bed, friction-shoes movable thereon, engaging-jaws 19, operating in sockets in said pulley, and each held outward by a spring, an actuating-plate fitted to said pulley, lugs movable through openings in said plate and engaging with said friction-shoes, actuating-levers pivoted to said plate, the wedges 10, secured to said levers, a link connecting each lug with its actuating-lever, a sliding cone made cylindrical at one end and provided with retaining-grooves to receive and hold the head of a bolt secured to each operating-lever 8, and bars 17, secured to said cone and adapted to be moved through openings in the actuating-plate to engage with the engaging-jaws in the pulley, substantially as described.

4. The combination, in a clutch, of a pulley provided with engaging-jaws, each movable in a socket and held outward by a spring, an actuating-plate fitted to said pulley and adapted to be rotated independently thereof, a sliding cone or block, and bars 17, secured to said sliding cone or block and adapted to be moved through said actuating-plate to engage with said engaging-jaws, whereby said pulley may be connected with or coupled to said actuating-plate or be disconnected or uncoupled therefrom, substantially as described.

JAMES GIBBINS.

Witnesses:
T. A. CURTIS,
E. E. HOLTON.